United States Patent
Ciapala-Hazlerig et al.

(10) Patent No.: US 12,069,788 B2
(45) Date of Patent: Aug. 20, 2024

(54) REMOTE LIVE SCENE CONTROL SYSTEM, METHODS, AND TECHNIQUES

(71) Applicant: Reactance LLC, Issaquah, WA (US)

(72) Inventors: Tyler Ciapala-Hazlerig, Issaquah, WA (US); Barbara Ciapala, Issaquah, WA (US)

(73) Assignee: Reactance LLC, Issaquah, WA (US)

( * ) Notice: Subject to any disclaimer, the term of this patent is extended or adjusted under 35 U.S.C. 154(b) by 0 days.

(21) Appl. No.: 18/229,036

(22) Filed: Aug. 1, 2023

(65) Prior Publication Data

US 2024/0032180 A1    Jan. 25, 2024

Related U.S. Application Data

(63) Continuation of application No. 17/952,037, filed on Sep. 23, 2022, now abandoned.
(Continued)

(51) Int. Cl.
| | |
|---|---|
| *H05B 47/19* | (2020.01) |
| *A63J 5/02* | (2006.01) |
| *A63J 5/04* | (2006.01) |
| *G06F 3/16* | (2006.01) |
| *H04L 67/12* | (2022.01) |

(Continued)

(52) U.S. Cl.
CPC .............. *H05B 47/19* (2020.01); *A63J 5/025* (2013.01); *A63J 5/04* (2013.01); *G06F 3/162* (2013.01); *G06F 3/165* (2013.01); *H04L 67/12* (2013.01); *H05B 45/20* (2020.01); *H05B 47/115* (2020.01); *H05B 47/155* (2020.01)

(58) Field of Classification Search
None
See application file for complete search history.

(56) References Cited

U.S. PATENT DOCUMENTS 9,520,014 B1    12/2016  Moshier
11,848,655 B1 *  12/2023  Khalilia .................. G10L 25/84
(Continued)

OTHER PUBLICATIONS

International Search Report issued in International Application No. PCT/US2022/044603 by the International Bureau on Mar. 30, 2023.

*Primary Examiner* — Wilson Lee
(74) *Attorney, Agent, or Firm* — Lowe Graham Jones PLLC; Ellen M. Bierman

(57) ABSTRACT

Apparatuses, methods, systems, and techniques for providing special effects wirelessly using a device plugged into a standard electrical outlet are provided. Example embodiments provide an apparatus and associated software applications for remote and live control of special effects (hereinafter a "Remote Special Effects System," or "RSES") using special effect (SE) devices such as individually addressable LEDs, LED strips, fog and smoke machines, and the like. The example RSES described herein comprises one or more SE controller devices that each plug into a standard electrical outlet and are each connected to one or more SE devices. Each SE controller is wirelessly connected to the Internet (or other wide area network) so that it can respond to DMX (or other protocol) commands sent by a remote application by issuing corresponding commands specific to the connected SE device to cause synchronized special effects to occur to an ad-hoc created zone of SE controllers.

26 Claims, 12 Drawing Sheets

Related U.S. Application Data

(60) Provisional application No. 63/248,991, filed on Sep. 27, 2021.

(51) Int. Cl.
    *H05B 45/20*     (2020.01)
    *H05B 47/115*    (2020.01)
    *H05B 47/155*    (2020.01)

(56) References Cited

U.S. PATENT DOCUMENTS

| | | | |
|---|---|---|---|
| 2007/0189026 A1 | 8/2007 | Chemel | |
| 2010/0171145 A1 | 7/2010 | Morgan | |
| 2020/0229289 A1* | 7/2020 | Cahill | G06V 10/7753 |
| 2021/0211156 A1* | 7/2021 | Kessler | H04L 25/4902 |
| 2022/0385063 A1* | 12/2022 | Protzman | H05B 47/105 |
| 2023/0083888 A1* | 3/2023 | Zavesky | H04L 67/12 700/110 |
| 2023/0117665 A1 | 4/2023 | Ciapala-Hazlerig | |

* cited by examiner

REMOTE LIVE SCENE CONTROL SYSTEM, METHODS, AND TECHNIQUES

CROSS-REFERENCE TO RELATED APPLICATIONS

This application is a Continuation of U.S. application Ser. No. 17/952,037, entitled "REMOTE LIVE SCENE CONTROL SYSTEM, METHODS, AND TECHNIQUES," filed Sep. 23, 2022, which claims the benefit of U.S. Provisional Patent Application No. 63/248,991, entitled "REMOTE LIVE SCENE CONTROL SYSTEM, METHODS, AND TECHNIQUES," filed Sep. 27, 2021, which application is incorporated herein by reference in its entirety.

TECHNICAL FIELD

The present disclosure relates to methods, techniques, and systems special effects technology and, in particular, to methods, techniques, and systems for location agnostic control of lighting, and other special effects such as light wave, electrical, and magnetic device output, haptic feedback, audio, and the like using wireless communication and a controller device that plugs into an electrical wall outlet.

BACKGROUND

Myriad electronically controlled systems exist for creating special effects such as lighting effects for theatre, music and other venues. These systems combine well known protocols for controlling all types of theatre lighting, fog machines, and other special effects systems. Over the years, such special effects systems have been wired to be controlled by computing systems that allow a person to control the lights to create effects (such as flashes, colored lights, gradients, lightning, etc.) or be programmed to automatically control them based upon timing other factors. The DMX protocol was developed initially for theatrical lighting and has become a standard for communicating with DMX friendly devices to cause them to act in certain ways, such as to turn the lights to a particular color and flash, to turn on a fog machine, or the like. The DMX protocol is to lighting and other DMX special effects devices as "MIDI" is to audio control. The most common lighting control protocols in use today include Art-Net, sACN/E1.31 and DMX512. Today, most any lighting or other stage effect equipment can be controlled using these protocols including moving lights, LED screens, fog and haze machines, and laser displays. Typically the equipment controlled by DMX are connected together into a universe (of 512 separately addressable channels) using DMX cables. In some scenarios, DMX consoles have been replaced by software, for example running on a personal computer, that connects via USB to a control device (such as a DMX USB interface) which then communicates through DMX cables to control the lights (or other) devices in that universe. Example DMX Software consoles include ArtNetominator (accessible at "https://www.lightjams.com/artnetominator"), DMXking (accessible at "https://dmxking.com/control-software"), Smart Show (accessible at "http://smartshow.lighting/free-dmx-software/"), and DMX-Workshop (accessible at "https://art-net.org.uk/resources/dmx-workshop/").

Several DMX over ethernet protocols exist today for communicating to such devices over wired Ethernet. Examples of such protocols include Art-Net, PathPort, ShowNet, sACN, and ETC Net2. These protocols in essence wrap a DMX packet with an IP address to address lighting fixtures such as LEDs in a venue. Art-Net is a UDP based protocol that generally works over a local area network such as an Ethernet. They include functions such as fader levels for individual lights, positions of movable lights and management functions for managing nodes in the DMX universe. DMX systems such as those described above are often expensive. As well they generally use lighting fixtures that are hard wired to connect to the DMX controller (DMX console or DMX control device that connects to a computer running DMX software console) because such venues typically require the reliability often associated with wired Ethernet connections.

DETAILED DESCRIPTION

Figure 1:
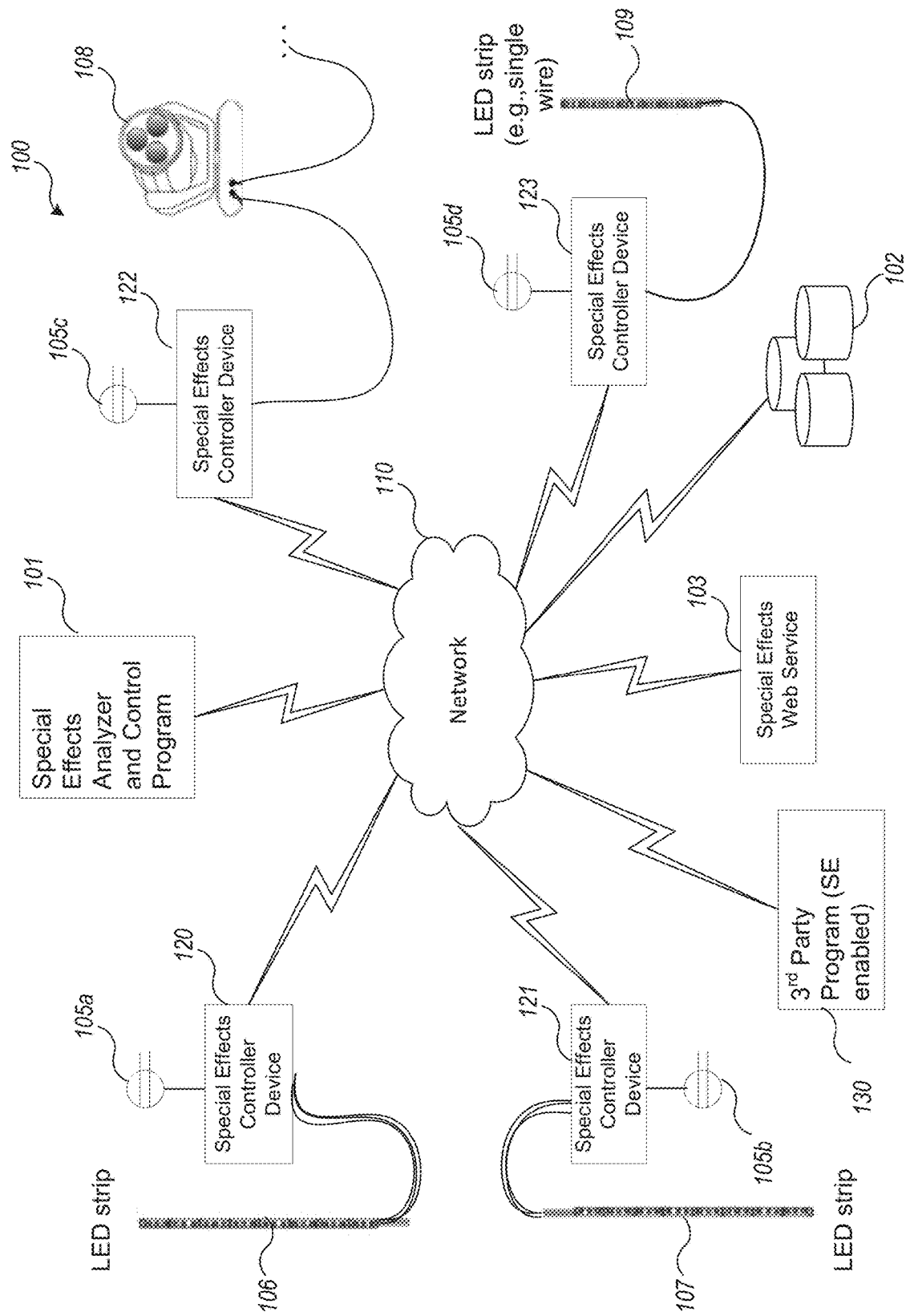
FIG. 1 is an example Remote Special Effects System which uses a plurality of special effects controller devices to remotely control special effects devices.

Embodiments described herein provide an apparatus and associated software applications, methods, and techniques, for remote control of special effects (hereinafter a "Remote Special Effects System," or "RSES") using special effect devices such as individually addressable LEDs, LED strips, fog and smoke machines, and the like. Although this description refers in examples to LEDs and other lighting devices, it is to be understood that the other types of devices, such as any IoT (e.g. network addressable) device, can be similarly controlled as long as one of the special effect devices is individually network addressable directly or indirectly and the apparatus has been programmed to address the protocol understood by the IoT device. For example, devices such as light wave (e.g., therapeutic) devices, wearable device outputs (e.g., haptic feedback, LEDs, audio), and the like can also be controlled through a Remote Special Effects System using the techniques described here regardless of the type of network they are on (e.g., wireless traditional or mesh or wired).

The example Remote Special Effects System described herein comprises one or more special effect controller devices (SE controllers) that each plug into a standard (residential or business) electrical outlet and are each connected to one or more special effects devices (SE devices) such as an LED strip, a fog machine, a horn, a wavelength output device, and the like. Each SE controller is wirelessly connected to a network such as the Internet (or other local area, wide area, or other network), directly or indirectly (e.g., through another SE controller), so that it can respond to DMX (or other protocol) commands sent by an application remote to the SE controller by issuing corresponding commands specific to the connected SE device to cause a special effect to occur. Thus, existing AV tools used by AV designers to emit DMX commands can be easily integrated into the RSES to control special effects for use by the general public (household or business or any use)—no specialized knowledge of the SE controller is required to generate these special effects. For example, if the special effects device is an LED strip of Neopixel LEDs produced by Adafruit Industries (which control RGB or RGBW LEDs using a single wire), then the SE controller can receive a packet with DMX commands (for example using an Art-net protocol packet whether it is from an existing AV tool or a new application), and then automatically issue corresponding driver instructions (e.g. WS28xx, WS2812, or other driver instructions) to address one or more of the Neopixel LEDs.

In an example embodiment, the SE controllers are printed circuit boards ("PCBs") that can be encased in available housings similar to the size of an AC adapter. Because these SE controllers are small devices that can utilize standard electrical outlets for power, they can be produced inexpensively thereby enabling theatrical quality lighting and other special effects to be produced at home and for the masses. Moreover, because they connect wirelessly to a network such as the Internet, they can be controlled remotely by applications, similar to most IoT devices (they can behave and be controlled as an IoT device). In addition, because of their wireless connectivity, the special effects devices can be placed in locations devoid of Ethernet, including locations that are controlled by different types of wireless networks such as traditional (centralized) networks and decentralized (mesh) networks. As well, the special effects devices controlled need not be DMX enabled or connected by unwieldly Ethernet cables in a semi-permanent (fixed for a time) configuration such as commonly found in a theatrical or other professional setting.

In other example embodiments, the PCB (SE controller) may be powered by a battery contained within, adjacent, or proximate to a housing. This enables some example SE controllers to be embedded in devices (rather than 'plugged in' to a wall socket) which communicate wireless, for example, with a remote application that controls special effect devices managed by the PCB controller. The SE devices may be resident on the same device that houses the PCB controller.

Using a wireless solution rather than hard-wired or Bluetooth solutions eliminates a need to have devices controlled together within a certain range, such as supported by Ethernet cables or Bluetooth's distance requirements. Rather, in some scenarios, the SE controllers can be joined together in an "ad-hoc" (at the time or as-available) fashion and synchronized (by another program) to create joint special effects in discrete and disjoint (not connected) physical locations, in the same physical location, in a virtual location, and/or across one or more devices. For example, in a virtual classroom where each student has at least one SE controller connected to a special effects device (such as a light strip or audio producing device), synchronized special effects can be triggered by the teacher through software programmed to communicate with the joined SE controllers, for example, to make sure the students are awake and paying attention. As another example, a virtual presentation with slides (e.g., delivered via a video conference) can be programmed (preprogrammed or controlled on the fly) to cause special effects as individualized or synchronized animations that occur in each physical or virtual location from where each viewer is participating (e.g., room, office, home, etc.). The special effects may even be targeted to an individual viewer. Or, they may be employed in a crowd situation such as to cause participants to group together by producing unique special effects to the target participants for each intended group. In addition, in some scenarios, the participants may have joint control over the special effects.

In other examples, sensor input (such as a weather station) may be obtained from an application, which generates special effects responsive to detection of certain conditions. For example, sensors connected to a human body that measure attributes such as heartrate, perspiration, blood flow, and the like may be connected to applications that use an SE controller plug-in to communicate with SE controllers connected to different special effects (output) devices. Other sorts of sensor input, for example input from wave length devices, magnetic, electrical, optical, and other devices, can be similarly accommodated. Accordingly, in some scenarios SE devices can be controlled and operate without direct human manipulation but rather from sensing a condition from a sensor that measures some characteristic of somebody or the environment.

In yet other scenarios, different special effect devices may be synchronized and coordinated such as might be useful in a teaching or presentation. For example, audio special effect devices may be synchronized to lighting or haptic feedback special effect devices as desired by the application controlling the SE controllers attached to these devices. In another example, proximity sensors may be located on devices or people or at locations that cause input to an SE controller enabled application. Upon sensing that two people/devices are in proximity of one another (or in proximity to some location), the application sends commands to one or more SE controllers which in turn control one or more (output) SE devices to produce synchronized or coordinated special effects.

Accordingly, there are many possible work related, home, and/or entertainment related uses of such SE controllers and related software.

In addition to these advantages over existing systems, other advantages are presented because the SE controllers are connected wirelessly to the Internet (or other local or wide area network) directly or indirectly (e.g., through another SE controller) and they accept any type of live DMX packet stream over a wireless network (e.g., using Art-Net or other protocol). For example, animations are not limited to pre-programmed lighting displays—a new and different experience can be offered each time an event is run. In addition, animations, music, or sound can be sourced live from anywhere in the world as long as the input source is Internet accessible. Further, the SE controllers can run any of approximately 2.8 million color combinations—limited only by the intelligent lighting apparatuses communicatively connected to the SE controllers.

Each SE controller is wirelessly connected to the Internet (or other wide area network or to a local network) so that it can respond to DMX (or other protocol) commands sent by an application remote to the SE controller by issuing corresponding commands specific to the connected SE device to cause a special effect to occur. The wireless connection may be a traditional (centralized) wireless network or a decentralized (e.g., mesh) wireless network. In addition, although example embodiments of the RSES are described for controlling SE devices that use DMX protocol (by wrapping them in Art-net packages for transport), it is to be understood that they system architecture and ideas presented here could be used to extend control to other types of devices controlled by other than DMX protocols. Similarly, other packet wrapper protocols beyond Art-net could be incorporated into an RSES and provide the functional benefits described herein.

FIG. 1 is an example Remote Special Effects System which uses a plurality of special effects controller devices to remotely control special effects devices, for example in a live manner targeted to discrete locations. As shown in FIG. 1, RSES 100 comprises one or more special effects controller devices 120-123 (SE controllers) connected wirelessly to wide area network 110, typically the Internet, and communicatively connected to one or more respective special effects devices 106-109. Each SE controller 120-123 is also connected to a corresponding electrical outlet 105a-105d for power. The SE controllers may reside in locations potentially geographically remote from each other (such as located in different physical residences, businesses, regions, or countries, e.g., having different postal addresses). For example SE controller 120 connected to LED strip 106 may be installed in student A's residence whereas SE controller 121 connected to LED strip 107 may be installed in student B's residence. Furthermore, other SE controllers, such as SE controller 122, may be installed in a different state or potentially a different country, in a building or other structure, or location not associated with a building provided that WiFi is available. Also, the SE controllers may share the same IP address or may have distinct IP addresses. The SE controllers 120-123 may be connected to a variety of special effects devices including, for example, individually addressable (RGB) LED strips 106 and 107, Leko light 108, or standard (dumb) RGB LED strip 109. Other devices such as fog and smoke machines, audio output devices, haptic feedback devices, other mechanical, electrical, and/or light wave devices, and myriad sensors and devices can be similarly connected and are not shown.

The SE controllers 120-123 are connected wirelessly to a special effects analyzer and control program (SE analyzer) 101 or an other special effects-enabled program 130 via network 110. These programs may execute on any type of computing device. The SE analyzer 101 demonstrated here, which in an example embodiment described below is known as the Remote Live Scene Control or "RLSC" application, is configured to analyze sound and send control data (such as lighting control commands) to each of the SE controllers 120-123 individually and can synchronize the behavior of these SE controllers 120-123 such that all or some of the connected special effect devices 106-109 (e.g., lights) react/behave in the same or different manner at the same or different times. In this way the SE controllers 120-123 can cause special effects that are synchronized or otherwise timed to cause a similar behavior to an audience even though the audience members are not present in the same physical venue and the SE controllers are thus in remote locations from each other. Of course the special effects can also synchronize special effects to one or more special effects devices in the same physical venue. Here venue refers to a physical address such as associated with a building, residence, event, open space, field, etc. Thus, the Remote Special Effects System can be used to unite an audience (through special effects) whose members are connected via a virtual venue such as a video conference over web based video conferencing software, or a presentation to a virtual audience connected to the venue through their computers. In addition, the RSES can also be used in a standalone environment such as to create theatrical and event quality special effects in one's one residence or business location.

As well, SE controllers 120-123 may respond to commands from a single presenter (such as a teacher or speaker), several presenters (e.g., a band), and/or one or more participants, for example in an interactive classroom, a family reunion, or a crowd. In addition, any of the effects streamed to the SE controllers 120-123 may be predesigned and thus "played back" or may be generated on the fly. All such combinations are contemplated.

In one example embodiment, the SE analyzer 101 is used to analyze sound, such as a song, soundtrack from a movie, a presentation, or any audio track and to cause special lighting effects such as using LED strips to change colors in a sequence or randomly or to produce some other type of lighting animation in conjunction with attributes of the sound, such as tone/pitch (measured for example as frequency) and loudness (measured for example as decibels). For example, based upon detection of a particular frequency, a corresponding color command(s) may be sent to an individually addressable LED, group of LEDs, or the entire strip. In the example system shown in FIG. 1, the SE analyzer 101 has been specifically programmed to generate commands via Art-Net (DMX over ethernet), which commands are sent to the various independently addressable SE controllers 120-123. Other commands according to other protocols (such as sACN, a streaming protocol that uses a multicast communication technique) may be similarly incorporated. Each SE controller 120-123, when it wirelessly receives an Art-Net (or other protocol) packet, translates the packet to an appropriate device protocol understood by the special effects device communicatively (in some cases electronically) coupled to the SE controller. For example in the case of an RGB pixel addressable LED strip 109 (such as Neopixel LED devices by Adafruit Industries), the SE controller 123 receives Art-Net packets and translates DMX lighting commands to a protocol understood by the ws2812 driver, used to control the Neopixel device 109.

Other third party programs and applications such as third party program 130 can used RSES application programming interfaces (APIs) and libraries to produce Art-Net (or other protocol) packets to control the RSES SE controllers 120-123. Thus, a mobile or other computer based application can be used to create readily accessible special effects, for example to play music with live special lighting effects that are created dynamically (on-the-fly) in response to analyzing the audio. Further, the same audio may be analyzed differently each time the music is played allowing different special effects experiences each time. Alternatively, predesigned lighting effects, or A/V artist designed lighting effects may be played alongside the music as it is played. In some scenarios, the SE analyzer and/or $3^{rd}$ party program 130 may incorporate data or stored configurations from data repositories 102.

As mentioned, the SE controllers 120-123 are location agnostic and can join a special effects "session" on an "ad-hoc" basis. For the purpose of this description, a session is defined as those SE controllers that are accessible and addressable to an SE analyzer 101 or special effects-enabled application 130 at a particular time. The SE controllers 120-123 can be unified by a special effects service (SE service) 103, for example a web service in a more centralized computer architecture scheme, that controls a concept of a session—which are the currently addressable SE controllers that the SE analyzer can control. Since the SE controllers may be plugged in and disconnected on the fly, the SE service maintains a concept of a current "session" for the SE analyzer 101. Alternatively, any special effects-enabled application, such as the SE analyzer 101 or the 3$^{rd}$ party program 130 may integrate their own (wireless) discovery and registration process such as using a mixture of login capabilities, scan and handshake protocols, etc. Any type of discovery and registration process may be used by the SE service 103 or by these programs to discover available SE controllers and/or to register them as part of a current session. In addition, any special effects-enabled program (such as SE analyzer 101 or program 130) can present a user interface for configuring users, SE controllers, presenters, etc. Thus, the SE analyzer 101 or special effects-enabled program 130 can not only cause special effects to happen dynamically (e.g., while analyzing an audio stream) but it is also "ad-hoc" and controls whichever SE controllers 101 are currently connected to the applicable session managed by the discovery and registration process. As an alternative to using a web service, the RSES arrangement can be adapted to a peer-to-peer system, where one of the SE controllers 120-123 becomes the server (or a "master") and acts to control the session aspect. In addition, the SE controllers that comprise the RSES arrangement can operate as a mesh network where each SE controller acts as a node, for example, using a protocol and API such as ESP-WIFI-MESH. Other suitable arrangements are contemplated, such as those that are strictly used in an Intranet scenerio.

Figure 2:
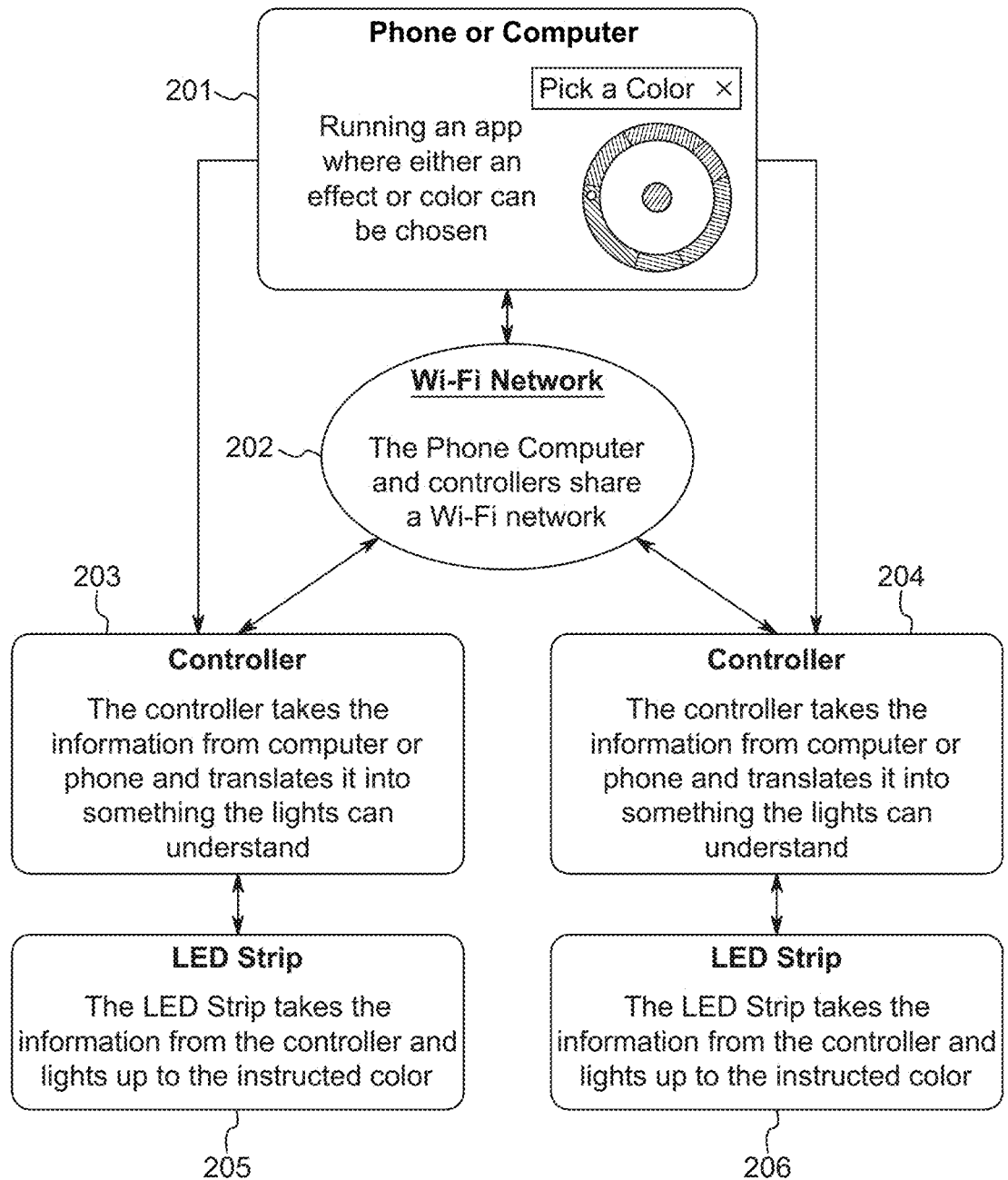
FIG. 2 is an overview flow diagram of how an example Remote Special Effects System operates according to an example configuration.

FIG. 2 is an overview flow diagram of how an example Remote Special Effects System operates according to an example configuration, such as that shown in FIG. 1, in order to generate synchronized special effects to an ad-hoc "session" (which can also form an ad-hoc network or subnetwork) of special effects devices. Here "synchronized" refers to timed special effects streams (which are coordinated according to a particular time, in an order or sequence, relative to each other, and other variations) which are forwarded to one or more SE controllers to coordinate special effects in potentially different physical (postal address or other lat/long designation) locations. The SE controllers also may reside in the same physical location, at the same IP address, or at different IP addresses, and any other such combination. Ad-hoc refers to a concept in which a "zone" of special effects devices (through their communicatively connected SE controllers) is created and made known to the SE analyzer 101 or 3$^{rd}$ party program 130, to which the special effects instructions are forwarded (e.g., sent, transmitted, multicast, broadcast, etc. depending upon the application and protocol being used). In block 201, an SE-enabled application such as SE analyzer 101 or 3$^{rd}$ party program 130 runs an application where a special effect is selected (e.g., a color scroll, or a "plasma" effect or a selected color) either programmatically or potentially by a user using a user interface or other tool. In response, the SE-enabled application sends out a DMX packet via WiFi (block 202) through Art-Net (or other protocols) to the network addresses (e.g., IP addresses, MAC addresses, etc.) associated with the SE controllers that have been registered with a current session (e.g., by SE service 103 or by an SE-enabled application with such capability). In blocks 203 and 204, each SE controller that is part of this ad-hoc session receives the packet and translates it into data that the communicatively connected SE device (e.g., LED strip 106) understands. The corresponding SE devices (blocks 205 and 206) then receive this packet (typically via a software or firmware driver associated with the respective device) and performs the special effects (e.g., lighting) command issued by the corresponding SE controller. Other types of SE devices and other types of special effects can be handled similarly.

Figure 3:
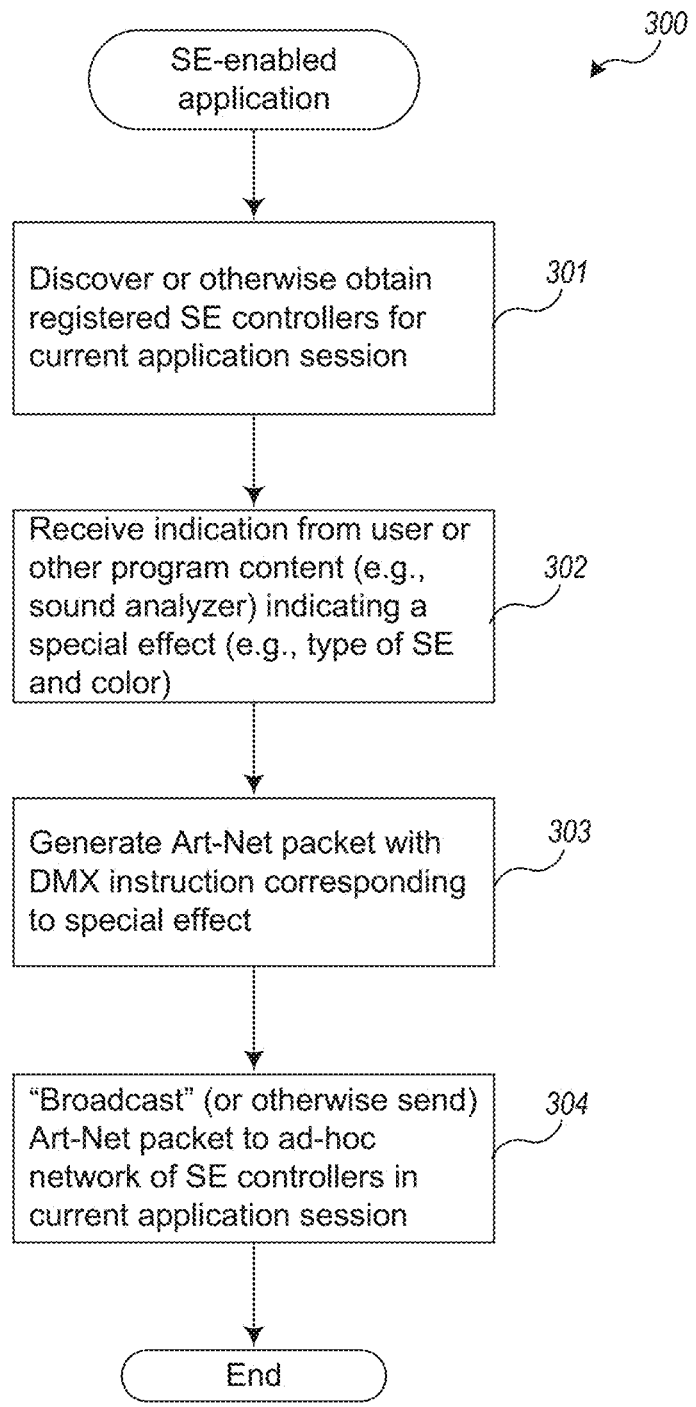
FIG. 3 is a flow diagram of a typical SE-enabled application according to an example Remote Special Effects System.
Figure 4C:
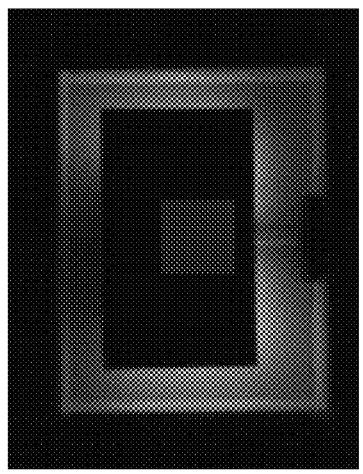
FIGS. 4A-4E are example special effects that can be created by an example Remote Special Effects System.
Figure 4B:
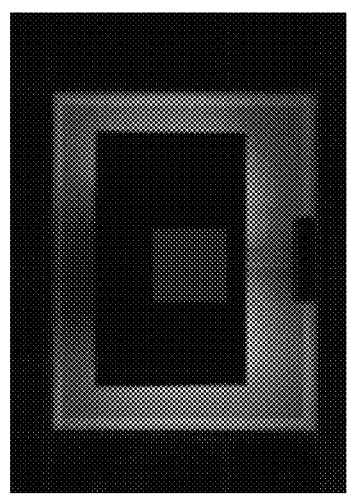
Figure 4E:
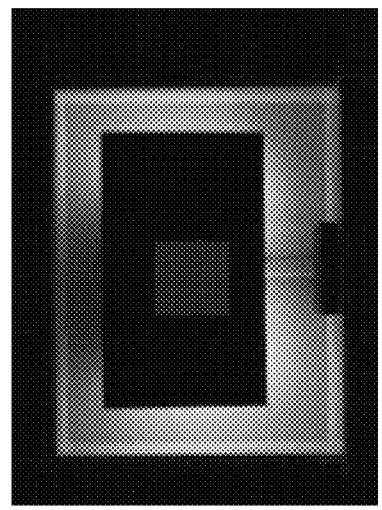
Figure 4A:
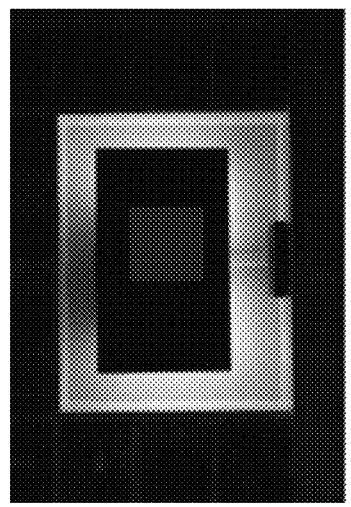
Figure 4D:
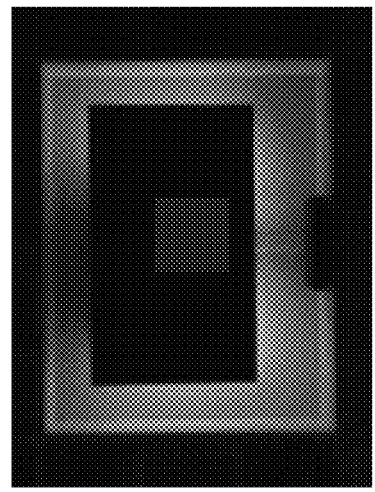

FIG. 3 is a flow diagram of a typical SE-enabled application according to an example Remote Special Effects System. The SE-enabled application 300 depicted is for example the sound analyzer effects control program 101 (called a Remote Live Scene Control application below) or a third party RLSC-enabled application such as SE-enabled application 130. Here, in logic block 301, the application discovers (e.g., via a web service 103) or otherwise obtains a list of currently connected SE controllers to which special effects are to be transmitted. This list forms an "ad-hoc" network (e.g., a synchronized special effects zone) of controllers for synchronized special effects. In block 302, the application receives an indication from a user (or a program such as a slide presentation program) of a special effect type and attributes. Other characteristics may also be included such as timing specifics, target SE controllers, and the like. An example Application Programming Interface (API) is described below for use by an SE-enabled application. In block 303, the application generates an Art-Net (or other protocol) packet that includes a computer understandable special effect (e.g., using DMX or other protocol). In block 304, this special effect packet is transmitted to some or all of the SE controllers in the ad-hoc network.

These packets are then received and processed by the SE controllers as described according to FIGS. 1 and 2.

FIGS. 4A-4E are example special effects that can be created by an example Remote Special Effects System as described herein. Here, each figure is a snapshot in a time series of a changing color animation produced by an SE controller using an installation of LEDs surrounding a person's computer screen. Using the RSES, in an environment that has multiple participants and different physical locations, each having a computer screen arranged similarly, an application can be used to trigger this special effect across the entirety of the ad-hoc connected SE controllers thus having participants have the same special effects produced around their computer screen at the same time or in a timed sequence (for examples to create a "wave" effect), or the like. Or the application can select and produce different special effects tailored to one or more of the participants and coordinate them in any manner (for example, to give focus to a particular participant or other speaker). For this reason, the example implementation of an SE analyzer is described below as "remote live scene control."

Figure 5A:
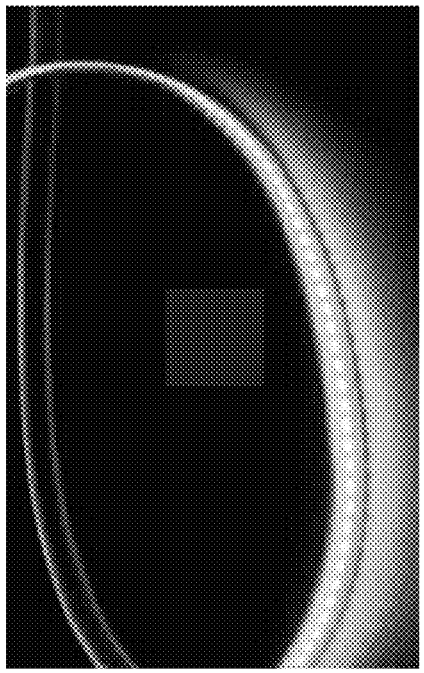
FIGS. 5A-5C are additional example special effects that can be created by an example Remote Special Effects System FIGS. 6A-6C provide three different views of a printed circuit board that implements an Emanator device according to the examples described.
Figure 5B:
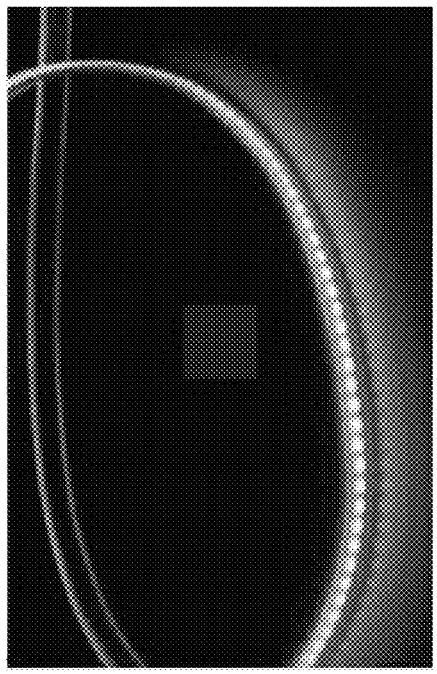
Figure 5C:
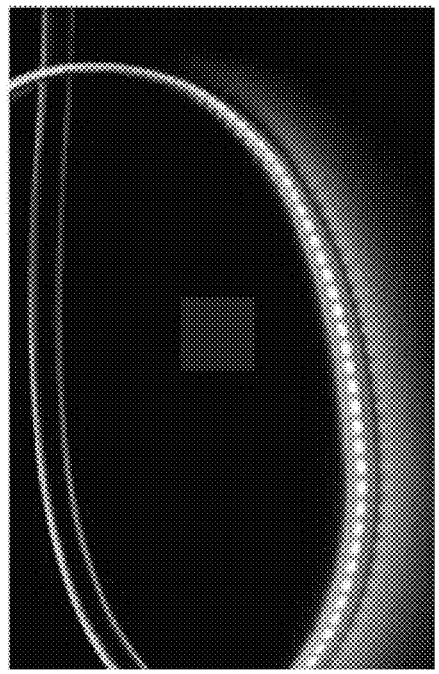

FIGS. 5A-5C are additional example special effects that can be created by an example Remote Special Effects System as described herein. Here, each figure is a snapshot in time of color rolling through an LED strip light attached to an SE controller. This special effect can be coordinated across multiple participants connected virtually as described according to FIGS. 4A-4E.

Of note, any of these special effects, applications, SE devices and SE controllers are also operable within a single physical address—for example, one or more SE controllers in a single (physical or virtual) room, multiple SE controllers connected to different devices in a single household or business, and any other combination. In addition, as new special effects devices that understand protocols such as DMX or other protocols become available, the SE controllers can be adapted (e.g., through updates to firmware) to translate DMX commands to a language (commands) that the drivers for the devices understand. Thus, the SE controllers are not limited to receiving DMX packets and generating any particular lighting commands (such as ws2812). Accordingly as new special effects are created for example using sensors or other apparatuses, the SE controllers can accommodate them to produce other or improved special effects.

As well, a current embodiment of the SE analyzer (the RLSC analyzer) produces DMX packets and transmits them using Art-Net protocol (IP addressable DMX). This sound analyzer and other applications can incorporate other protocols as they are developed and the SE controller firmware updated. Accordingly, the RSES described here may be expanded to incorporate different and other protocols and other devices.

Example embodiments described herein provide applications, tools, data structures and other support to implement a Remote Special Effects System to be used for live or pre-programming special effects to be delivered wirelessly in a synchronized fashion to specific devices in separate physical locations. Other embodiments of the described techniques may be used for other purposes. In this description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Example RSES Embodiment

An example RSES embodiment with the components described according to FIGS. 1-3 is directed to producing special effects using lighting and the DMX protocol (via Art-Net protocol). This example embodiment includes one or more SE controllers, which are referred to as Emanator devices. These are the devices that plug into a standard electrical outlet and control a lighting device such as an LED strip. In operation, a participant who is participating in a session managed by the RLSC application plugs the special effects devices (such as an intelligent light or fixture) into an Emanator device, and then plugs the Emanator device into a wall electrical outlet.

The example RSES embodiment also includes an application, the Remote Live Scene Control application (or RLSC application), which is configured to produce special effects as described according to FIGS. 2 and 3. The example RLSC produces Art-Net packets with DMX commands, however can be modified as described above. In addition, the example RSES embodiment includes an API which can be used to develop other special effects-enabled applications.

Other example components and embodiments are of course possible to be developed to produce synchronized lighting effects and other special effects as described herein.

Remote Live Scene Control Application:

The example RLSC application, which may be provided via a mobile, IoT, or wired computing system, is designed to configure and organize one or more Emanator devices and stream effects to each Emanator device or combine them all into one or multiple synchronized special effects zones. The application includes user and device discovery features for easy setup and facilitates organizing and combining devices into zones for further custom control. The app provides various pre-programmed effects including some that will react to live audio and produce lighting (or other scene) effects synchronized to audio. The RLSC user may also configure control of the various participants' special effects devices over the Internet for applications such as live virtual meetings or concerts. In some examples, the RLSC application can be operated to produce on-the-fly (dynamic) special effects as well as pre-programmed, pre-designed, or pre-recorded effects. In some scenarios, these pre-programmed/designed/recorded special effects may be obtained from AV designers who have produced them for theatre or movies using industry standard DMX consoles or equivalents.

In one embodiment the RLSC application includes (or is accompanied by a separate) RLSC Music Analyzer which analyzes sound based upon frequency (or pitch) and loudness as described with reference to FIG. 1. The RLSC Music Analyzer is an example of a third party application that can be written once it is special effect-enabled—that is using the Emanator device API. Using the Emanator API, the third party application can stream data in real time and send it to one or more Emanator devices.

As described, an application such as the RLSC application can be used to generate and control special effects for a synchronized special effects zone of a plurality of Emanator devices (which may reduce to one special effects device connect to one plugged-in Emanator). This capability is referred to as "remote live scene control." For example, an RLSC application may:

Run an application with remote live scene control;
Play a movie with remote live scene control;
Play music with remote live scene control;
Conduct a virtual meeting with remote live scene control; or
Facilitate a group gathering with remote live scene control.

Many examples include the concept of no one missing the event because they cannot attend physically—this is referred to as "virtual live immersion." The following scenarios are just some of these contemplated examples in addition to those summarized above:

Play music to artist supplied lighting effects:
    Play your music with live analyzed lighting effects. Different analyzed lighting effects can offer different experiences each time music is played; or
    Play your music with live pre-designed light effects, e.g., NV artist designed lighting effects. (MP3 & DMX lighting effects together)
Virtual meetings with "at home" lighting synchronized with presentation. Slideshow initiated preprogrammed effects.
    Grab your virtual audience's attention with a stroke of lightening & thunder effects happening in the room—not just the screen.
    Your sound, prerecorded voice or video, with live analyzed effects. Duplicated playbacks can vary based on sound analyzer or pre-designed Light effects.
Other Virtual Examples include:
    Waiting on hold for any service (e.g., medical)
    Soothe online patients with music set to reduce stress scene/light displays.
    Virtual school with teacher presentation synchronized in students' room at home, dorm, or any location, examples:
        Synchronize attendee lighting with the push of a button to wake up snoozing students during class with synchronized lighting across all attendees.

Picture effect on all attendees screens, the all the virtual attendees' squares can be sync'd with the lighting in the room.

Flash lights on one attendee to gain attention or focus attention.

Virtual Family Reunions

Play family games (Trivia, Jeopardy) with live player(mic) sound, music, or noise analyzed live with lighting responding across all family's homes.

Virtual Church or School Choirs

Virtual choir analyzed with live lighting responding on all device screens as well as in the home.

Choir with live pre-designed light effects. e.g., A/V artist designed lighting effects. (MP3 & DMX lighting effects together)

Virtual DJs

Virtual dances music & sound analyzed with live lighting responding on all screens as well as in each home or location.

Virtual weddings with preprogrammed lighting effects occurring in each location. No one misses the event; they were immersed in it virtually. All participants can effect and create the event.

Virtual Theatre

Virtual Play with professional dramatic stage effects occurring in location home, rented space, etc.

All virtual participants can effect and create the event.

Virtual Theatre with pre-designed light effects. e.g., NV artist designed lighting effects. (MP3 & DMX lighting effects together)

Movies come alive in your home—

Experience your home lighting or devices responding to the crack of sound or lightening during a Harry Potter movie or blinding light for hyperdrive in Star Wars. Theatrical special effects brought to the masses.

Movies download with pre-designed light effects. e.g., NV artist designed lighting effects. (Video file format & DMX lighting effects together)

Virtual Concerts

Attend concerts with stage effects happening in your location, home, backyard, any location. Music analyzed on the fly or pre-designed light effects. e.g., A/V artist designed lighting effects.

Gaming

Not just stagnant LEDs behind your monitor but light that reacts to game events.

Game music analyzed lighting effects.

pre-designed light effects. e.g., NV artist designed lighting effects integration into the game Presentations Videos or music included in presentation synchronized with room lighting Analyzed effects for music or noise from presenter (pragmatic pauses) or audience (applause)

Pre-designed effects to wake-up audience

Sensors hooked

Key activated lighting in applications

E.g., Running/Exercise

The RSES technology can be used to create cost effective personal pace trainers for runners or cheaper alternatives for schools or lower budget training operations.

Pacing machine effects using portable waterproof LEDs

Replace existing and expensive light training products with a more cost effective solution (costing tens of thousands of dollars for equipment & installation costs) for improving a runner's pace. Example, sections of lights can be set up around a field or track and a smartphone or computer can synchronize a pace light, section of illuminated LEDs, where runners must try and run as close to the lights as possible.

Grid LEDs

Times Square like effects for advertising and other purposes

Figure 6C:
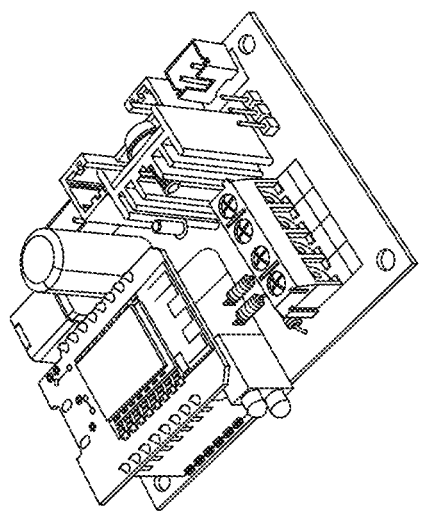
Figure 6B:
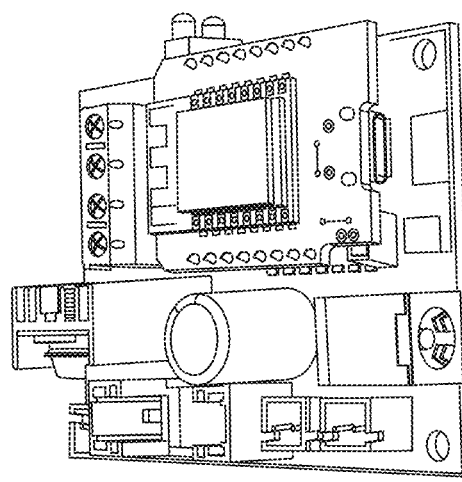
Figure 6A:
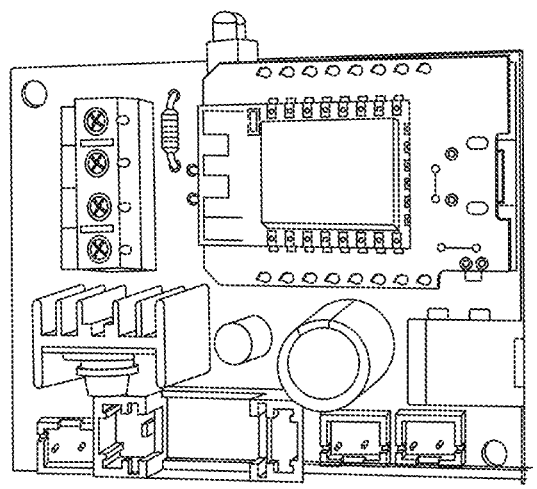
Figure 7A:
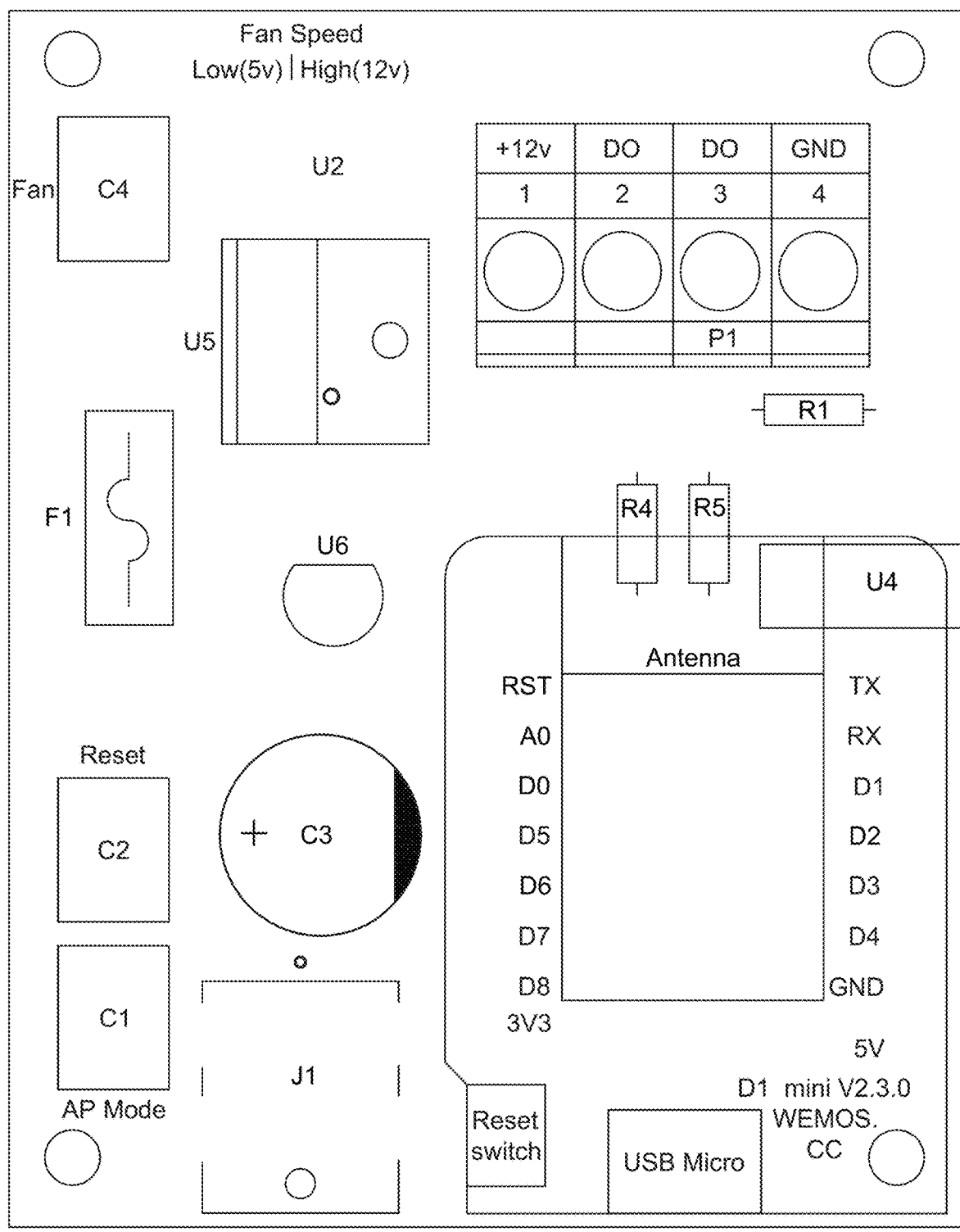
FIGS. 7A-7C provide component layout information for the Emanator device.
Figure 7B:
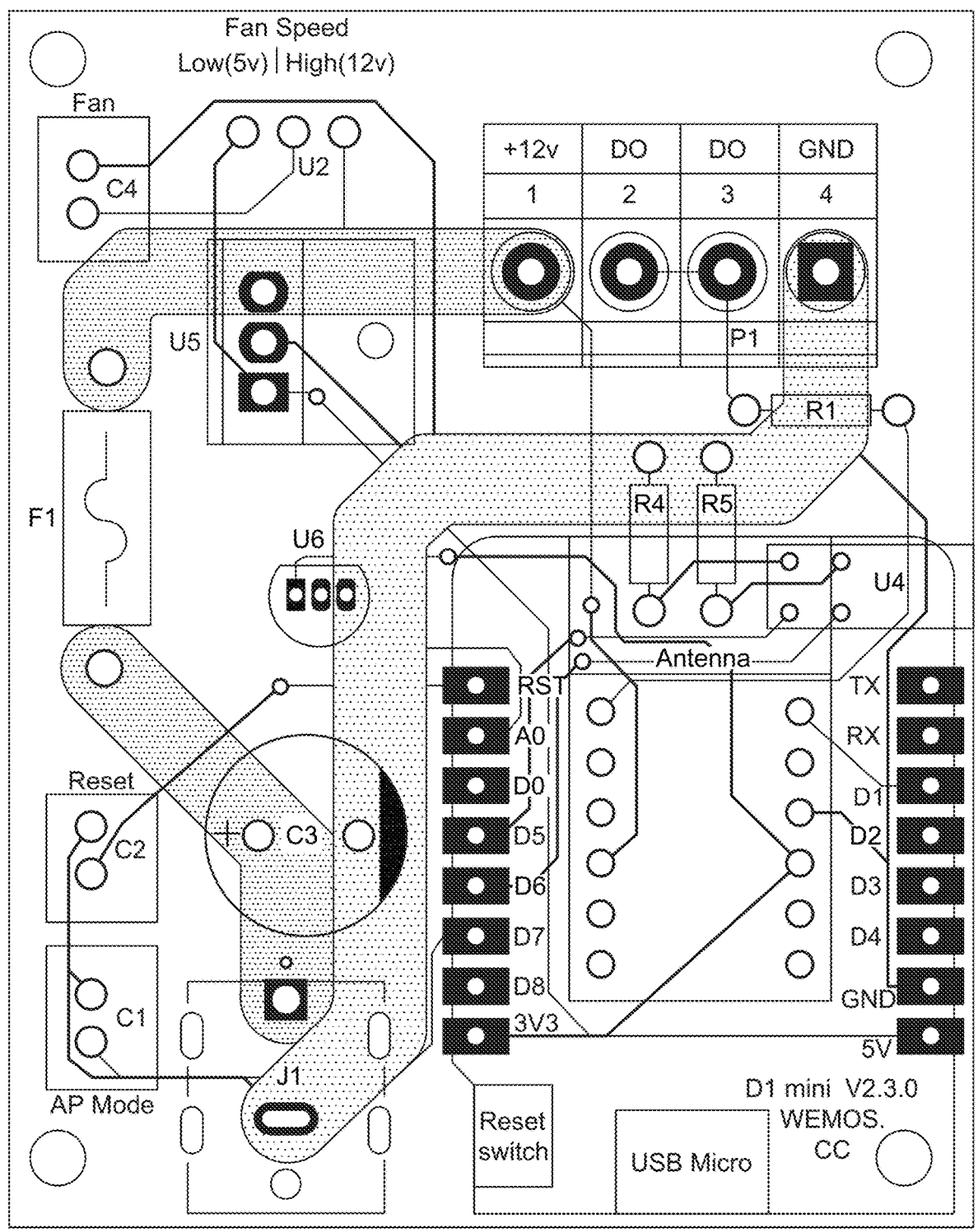
Figure 7C:
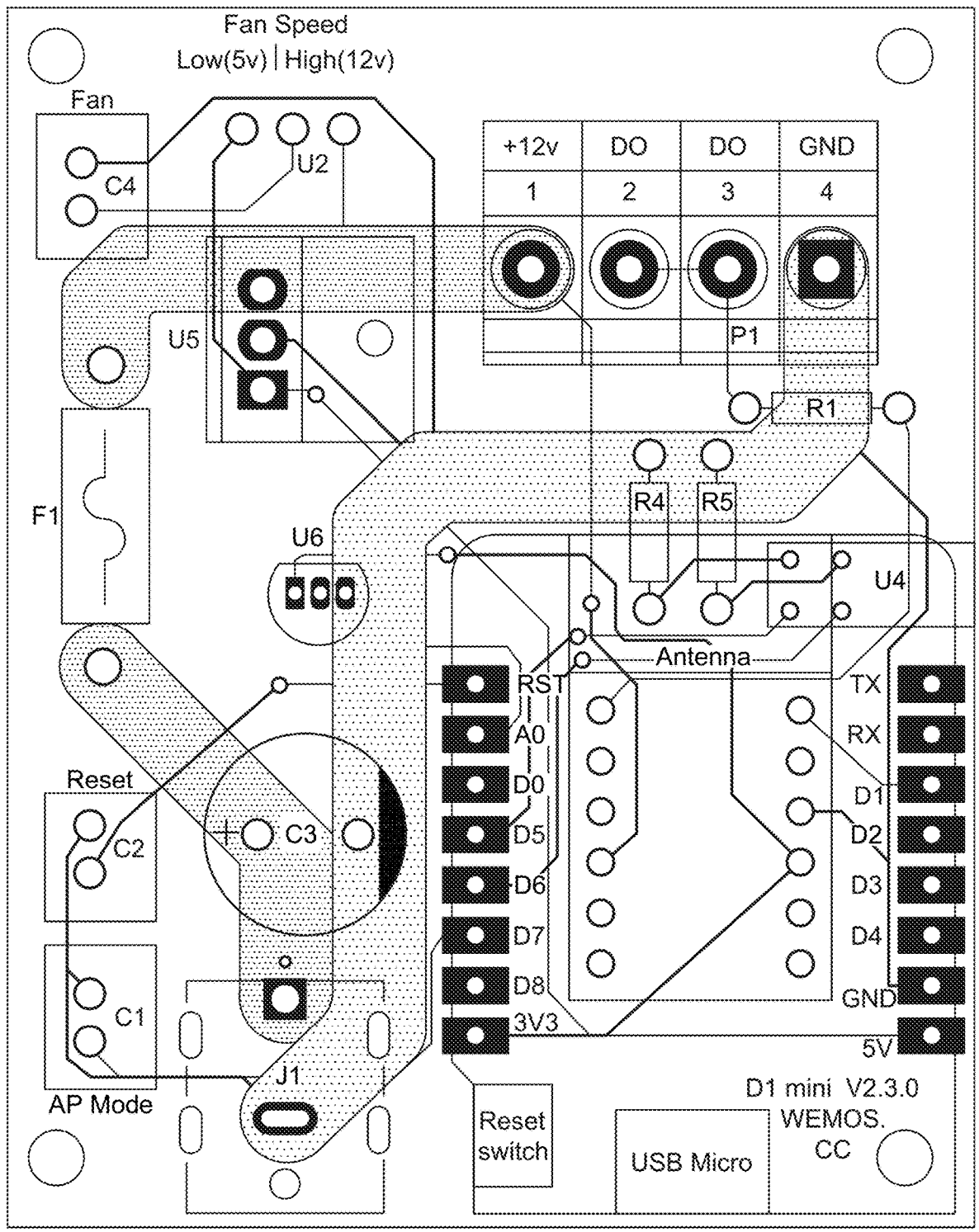

Emanator (Special Effects Controller):

An example RSES embodiment provides an Emanator device as the SE controller. FIGS. 6A-6C provide three different views of a printed circuit board that implements an Emanator device according to the examples described. The device includes a WiFi chip, a microprocessor, a fan, an AP (access point) mode header and various buttons and other components including firmware. FIGS. 7A-7C provide component layout information for the Emanator device. Other embodiments that are powered from proximate battery power can be similarly accommodated.

In summary of operation, 12V power enters the PCB and goes through some power conditioning to prevent spikes and elongate the life of the LEDs. In its current configuration, the board contains a Wemos D1 Mini which includes an ESP8266 WiFi chip for wireless connectivity. In other configurations (not shown), the board is configured to include an ESP32 chip which is more powerful, dual-core, and provides other functionality such as Bluetooth for configuration purposes. Other chips can be similarly incorporated. The PCB receives Art-Net data packets through WiFi and the firmware on the ESP8266 chip processes it and outputs data the LEDs can understand (e.g., WS28xx driver commands for Neopixel LEDs). There is a terminal block header which delivers power and data to the LEDs. Additionally, the board contains fan, reset, and AP-mode headers. The fan header provides configurable 5 or 12 volts for an optional cooling fan. The reset header provides a connection for an external reset button, which resets ESP8266 chip. The AP-mode button provides a connection for an external button that can force the board into configuration mode to reconfigure the wireless connection.

The Emanator firmware on the PCB has an Art-Net receiving library (e.g., from public domain software) which takes the WiFi delivered Art-Net data and provides the raw DMX, which is sent to the light or fixture to display requested color/state.

In an example Emanator device that is connected to NeoPixel LEDs, then the Neopixel library (e.g., from public domain software) resident on the PCB generates the ws28xx compatible data (DMX data sends digital signals over the pin out in the order it needs to light the lights as requested (0-N #lights out of one pin)—telling them one of the millions of RGB values).

When the PCB receives a Wi-Fi transmission, the firmware processes the packet using the Art-Net receiving library and sends the signals to the lights, for example using the Neopixel library. In this manner, the Emanator PCB acts as a translator from DMX commands to lighting device compatible commands. Thus, the Emanator firmware turns (e.g., a Neopixel) LED device into a network addressable DMX device. Other translations can be programmed into the Emanator PCB.

In its current implementation, the PCB firmware is configurable using a web-based user interface. Config settings include what number of LEDS are connected to the board, which pin is connect to the LEDs, 2 status indicators that can be turned off, WIFI network connected, IPaddress, Art-Net universe information, and the like. An RLSC application or other SE-enabled application may be programmed to configure Emanator devices.

Figure 8A:
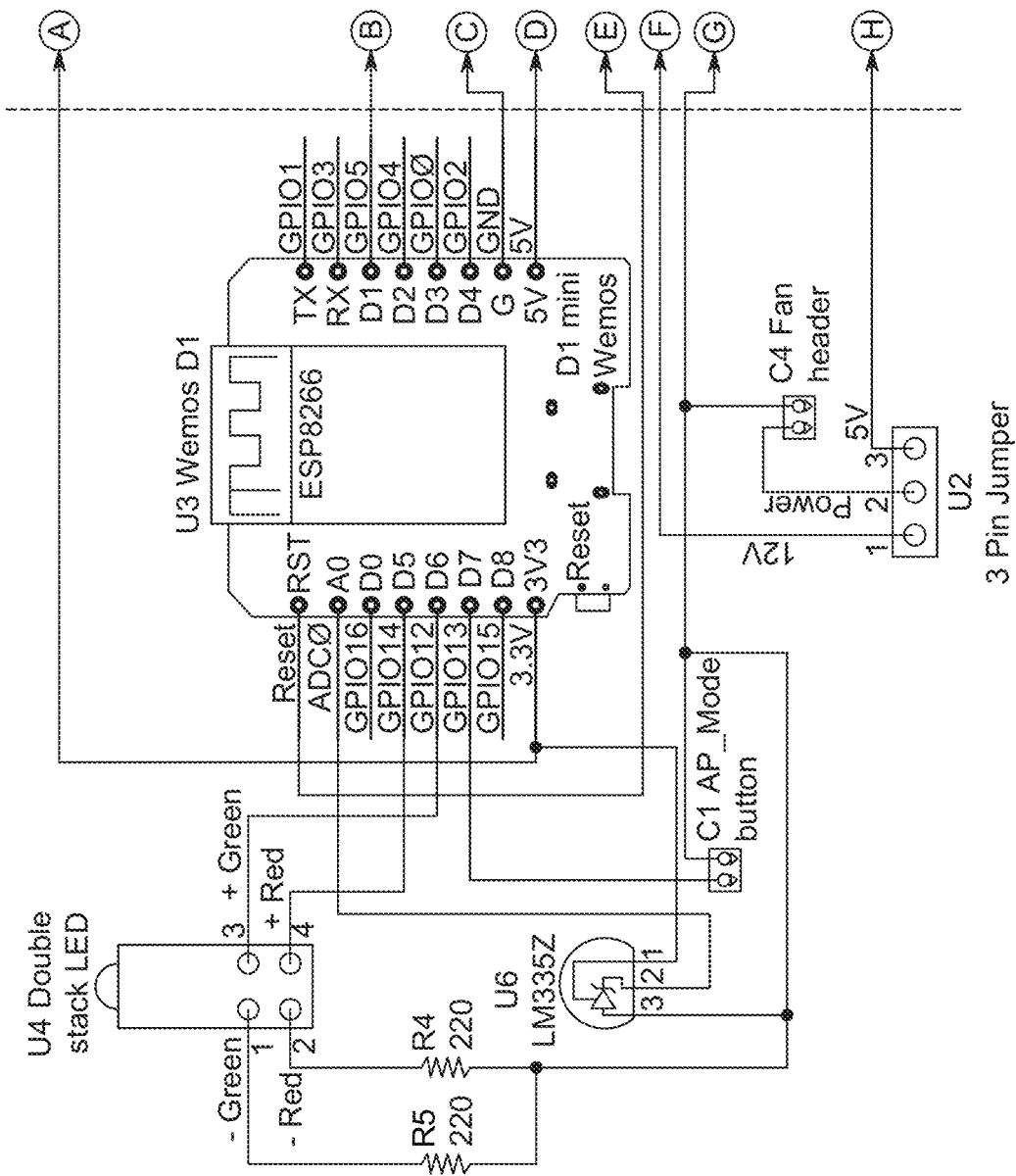
FIG. 8 is a wiring schematic of an example printed circuit board for implementing a special effects controller.
Figure 8B:
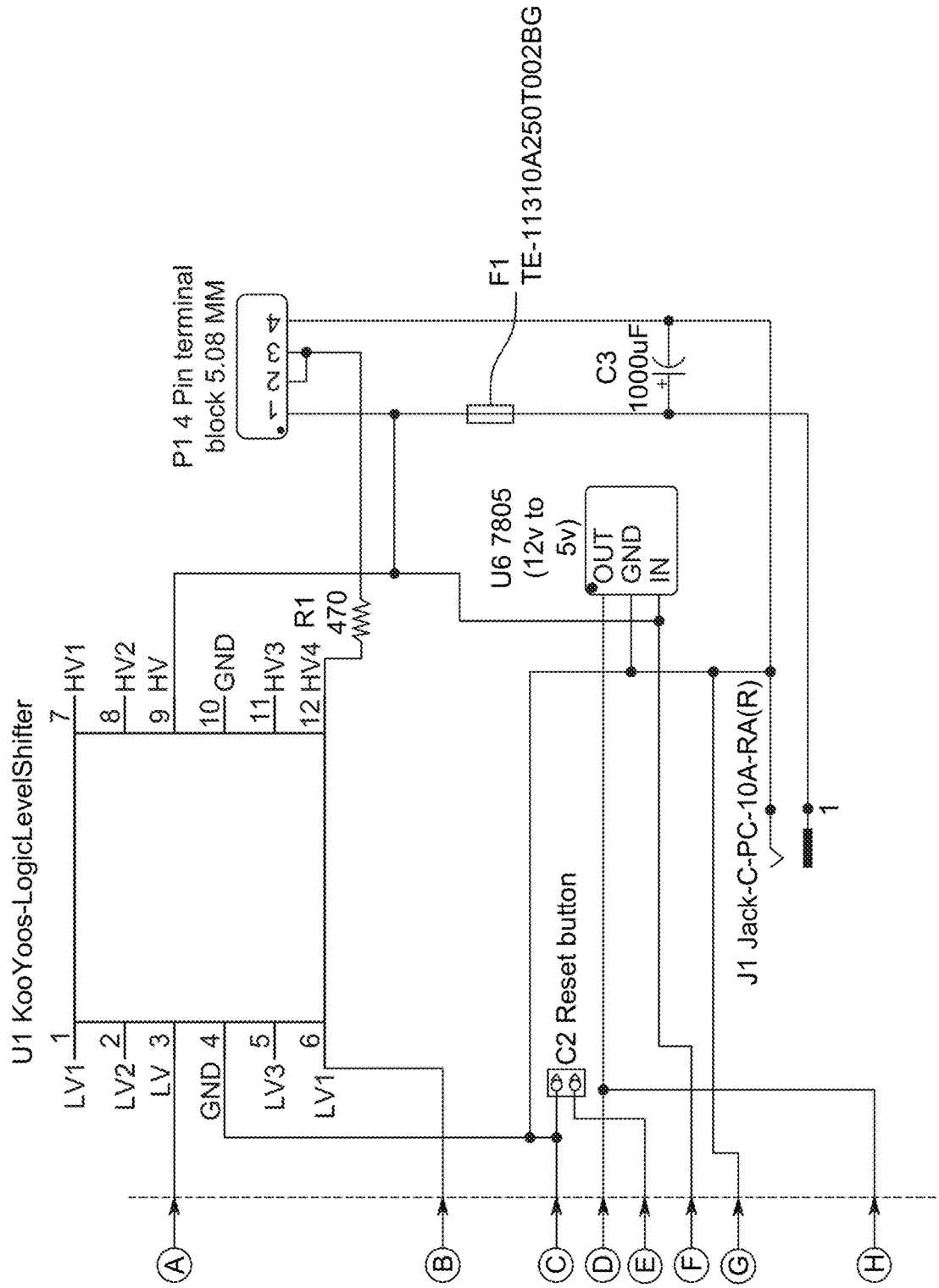

FIG. 8 is a wiring schematic of an example printed circuit board for implementing a special effects controller. In summary, power comes in and is funneled thru a capacitor which cleans the power. It then goes thru a fuse to prevent drawing too much power and damaging the controller. Then 12 v power goes to LEDs. In one embodiment, the PCB has a fan header to power a 5 v or 12 v fan and a reset button header. It also has an AP mode header to turn the PCB into Access Point mode to reconnect WiFi. The PCB also includes a 12 v to 5 v stepdown, to step power for WEMOS board which has the ESP8266 chip on it. Other microcontrollers and other WiFi chips can be similarly supported. The logic shifter is used to shift 3.3 volt out of WEMOS to 12 volt logic the LED strip needs. The PCB includes LED indicator stack lights with 2 resistors that act as status indicators for the board. There is also another resistor to clean data signal from WEMOS to the LEDS. The data signal to the lights, of 24× n bits, (where "n" is the number of lights in the LED strip and 24 bit provide 24-bit color to a single LED) is run thru a resistor to purify the signal and reduce noise.

The bulk of the PCB is power delivery to lights and electrical safety features. Specifically, the PCB moderates the lights from pulling too much power from the power supply, thereby reducing LED burnout and power supply overheating which can cause a potential fire. The PCB contains a capacitor to prevent spikes in power to the LEDs and a fuse to prevent burning out the power supply.

The PCB can be programmed to control any IoT (internet of things) device, any network addressable device, including another computing device.

RSES Application Programming Interface (API):

An example RSES embodiment also includes an application programming interface defining functions for facilitating the development and publication of special effect-enabled applications.

Table 1 below includes an example set of interfaces. It is to be understood that variations are possible and can be incorporated. In addition, functions may be added, modified, or removed.

TABLE 1

| Resource (piece of data) | POST | GET User Interface | PUT | DELETE |
|---|---|---|---|---|
| /userid - possibly login | Create a new user with Experiential Mode of Userid RLSCInputActive Y/N | Define Userid Sole Presenter Joint Presenter Crowd/Class Presenter Audience Member (default) | Bulk update of userid | Remove all userid's |
| /stream | Define Audio/Video Stream PreDesigned, Adhoc, Combo | Define Stream Stream w PreDesigned SE Stream w AdHoc SE (default) Combined Stream in Zone Zone Settings | Bulk Update | |
| /RSLC Device Types | Define Devices Available for Analysis | Define Device LED Lights (default) Fog Machines Motion Sensor Temperature Senor | Update details of userid | |
| /RSLC Controller | Adjustment Control for RSLC Devices | Adjust Device On/Off Settings Wifi Brightness Loudness Moodness etc | Update | |
| /RSLC Analyzer | Adjustment Control for RSLC Analysis | Adjust Device On/Off Settings Brightness Loudness Mood Options etc | | |
| /Stream State | Streaming with End User Control | Stream Control Play (default after timeout) Pause FF RW | | |

TABLE 1-continued

| Resource (piece of data) | POST | GET User Interface | PUT | DELETE |
|---|---|---|---|---|
| /Shared Devices | Devices Across Zone Avail with Setting for each Settings Owner Type Protocol Shared etc | Define Device LED Lights (default) DMX Device Sensor | | |

Example Computing System

Figure 9:
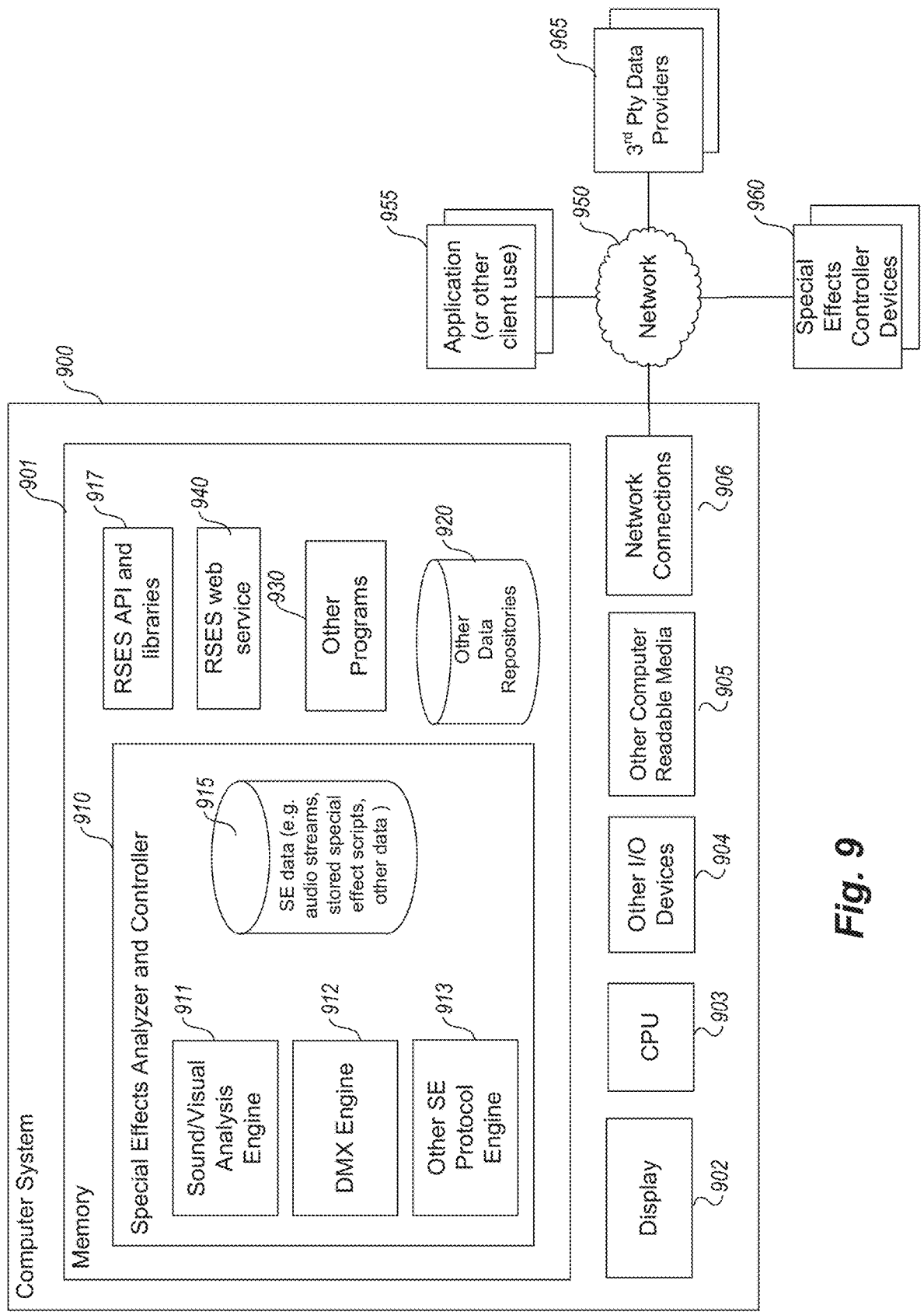
FIG. 9 is an example block diagram of an example computing system that may be used to practice embodiments of components of a Remote Special Effects System.

FIG. 9 is an example block diagram of an example computing system that may be used to practice embodiments of components of a Remote Special Effects System described herein, such as the Special Effects Analyzer and Controller (SE Analyzer 101 of FIG. 1), or other third party special effects-enabled applications (application 130 of FIG. 1). Note that one or more general purpose virtual or physical computing systems suitably instructed or a special purpose computing system may be used to implement an RSES. Further, components of the RSES may be implemented in software, hardware, firmware, or in some combination to achieve the capabilities described herein.

Note that one or more general purpose or special purpose computing systems/devices may be used to implement the described techniques. However, just because it is possible to implement the SE analyzer on a general purpose computing system does not mean that the techniques themselves or the operations required to implement the techniques are conventional or well known.

The computing system 900 may comprise one or more server and/or client computing systems and may span distributed locations. In addition, each block shown may represent one or more such blocks as appropriate to a specific embodiment or may be combined with other blocks. Moreover, the various blocks of the SE analyzer/RLSC application 910 may physically reside on one or more machines, which use standard (e.g., TCP/IP, UDP/IP) or proprietary interprocess communication mechanisms to communicate with each other.

In the embodiment shown, computer system 900 comprises a computer memory ("memory") 901, a display 902, one or more Central Processing Units ("CPU") 903, Input/Output devices 904 (e.g., keyboard, mouse, CRT or LCD display, etc.), other computer-readable media 905, and one or more network connections 906. The SE analyzer/RLSC application 910 is shown residing in memory 901. In other embodiments, some portion of the contents, some of, or all of the components of the SE analyzer/RLSC application 910 may be stored on and/or transmitted over the other computer-readable media 905. The components of the SE analyzer/RLSC application 910 preferably execute on one or more CPUs 903 and manage the generation of special effects in a synchronized zone across a wireless network, as described herein. Other code or programs 930, the RSES web service 940, RSES API definitions and libraries 917, and potentially other data repositories, such as data repository 920, also reside in the memory 901, and preferably execute on one or more CPUs 903 as required. Of note, one or more of the components in FIG. 9 may not be present in any specific implementation. For example, some embodiments embedded in other software may not provide means for user input or display.

In a typical embodiment, the SE analyzer/RLSC application 910 includes one or more sound analysis engines 911, one or more DMX or other protocol generation engines (or libraries) 912, a data repository 915 of special effect information, scripts, configuration parameters, etc., and other components such as a different special effects engine 913. In at least some embodiments, the other special effects engine 913 is provided external to the SE analyzer/RLSC application and is available, potentially, over one or more networks 950. Other and/or different modules may be implemented. In addition, the SE analyzer/RLSC application 910 may interact via a network 950 with other special effects-enabled applications or client code 955, one or more SE controllers (Emanators) 960, and/or one or more third-party information provider systems 965, such as pre-designed AV effects. Also, of note, the 915 data repository may be provided external to the SE analyzer/RLSC application as well, for example in a knowledge base accessible over one or more networks 950.

In an example embodiment, components/modules of the SE analyzer/RLSC application 910 are implemented using standard programming techniques. For example, the SE analyzer/RLSC application 910 may be implemented as a "native" executable running on the CPU 103, along with one or more static or dynamic libraries. In other embodiments, the SE analyzer/RLSC application 910 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the SE analyzer/RLSC application 910 (e.g., in the data 915) can be available by standard mechanisms such as through C, C++, C #, and Java APIs; libraries for accessing files, databases, or other data repositories; through scripting languages such as XML; or through Web servers, FTP servers, or other types of servers providing access to stored data. The data repository 915 may be implemented as one or more database systems, file systems, or any other technique for storing such information, or any combination of the above, including implementations using distributed computing techniques.

Also the example SE analyzer/RLSC application 910 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an SE analyzer/RLSC application.

Furthermore, in some embodiments, some or all of the components of the SE analyzer/RLSC application 910 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 63/248,991, entitled "REMOTE LIVE SCENE CONTROL SYSTEM, METHODS, AND TECHNIQUES," filed Sep. 27, 2021, is incorporated herein by reference, in its entirety.

From the foregoing it will be appreciated that, although specific embodiments have been described herein for purposes of illustration, various modifications may be made without deviating from the spirit and scope of the invention. For example, the methods and systems for performing special effects discussed herein are applicable to other special effects devices and for purposes other than those described here. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. An apparatus for controlling a special effects device comprising:
 a wireless network controller;
 a data connector configured to communicatively connect to one or more special effects devices; and
 a microprocessor including firmware; and
 a housing configured to house the data connector and the microprocessor to communicatively connect to the special effects device;
 wherein the firmware is configured to receive a stream of data packets wirelessly using the wireless network controller, wherein each packet in the stream contains data structured according to a special effects device protocol, and wherein, for each packet, in response to special effects device protocol instructions contained in the packet, the firmware generates one or more corresponding electro-magnetic, mechanical, and/or optical signals and transmits them to one or more of the one or more communicatively connected special effects devices to cause the special effects device to create a special effect.

2. The apparatus of claim 1 wherein the housing plugs into a standard electrical outlet to receive power.

3. The apparatus of claim 1 wherein the apparatus receives power from a battery device.

4. The apparatus of claim 1 wherein the special effects device protocol is DMX.

5. The apparatus of claim 1 wherein the special effects device is an LED device and the special effect is a color.

6. The apparatus of claim 1 wherein the special effect causes a change in color, color gradient, a timed color progression, or a pulsation of a single color or different colors.

7. The apparatus of claim 1 wherein the special effects device is a fog machine or a smoke machine.

8. The apparatus of claim 1 wherein the apparatus causes the special effect to occur in response to receiving a value sensed by a sensor.

9. The apparatus of claim 1 wherein the special effects device is a light wave device, a magnetic device, and/or an electronically controlled device.

10. A method for controlling special effects, comprising:
 under control of a plurality of special effects software or hardware controllers, each communicatively connected to a special effects device, communicating wirelessly to receive one or more data packets and sending a corresponding signal compatible with the connected special effects device to facilitate causing a special effect to occur; and under control of special effects enabled code logic,
discovering and registering two or more of the plurality of special effects controllers at a plurality of network addresses to create an ad-hoc special effects synchronization zone;
receiving an indication of a special effect type and timing; and
causing a stream of data packets to be distributed wirelessly to one or more of the discovered and registered plurality of special effect controllers according to the indicated special effect type and timing, such that a special effect is caused to be performed on each of the special effects devices that is communicatively connected to a corresponding one or more of the discovered and registered plurality of special effect controllers.

11. The method of claim 10 wherein at least one of the plurality of special effect controllers is located at a first network address and wherein at least an other of the plurality of special effect controllers is located at a second network address, the first and second network addresses being at distinct locations from each other.

12. The method of claim 10 wherein the received one or more data packets adhere to a DMX protocol.

13. The method of claim 10 wherein the indicated special effect type and timing is associated with a portion of an audio stream or audio data.

14. The method of claim 13 wherein the audio stream or data is being delivered live.

15. The method of claim 13 wherein the audio stream or data is pre-recorded, pre-defined, or automatically computed.

16. The method of claim 13 wherein the stream of data packets caused to be distributed wirelessly to one or more of the discovered and registered plurality of special effect controllers is responsive to an analysis of the audio stream or data.

17. The method of claim 10 wherein the special effects enabled code logic is configured when executed to receive an indication of a special effect type by receiving data from a sensor indicative of a condition for which the special effect type is appropriate.

18. A computer-readable storage medium containing instructions for controlling a computer processor, when executed, to cause special effects to occur on a plurality of special effects devices, by performing a method comprising:
discovering and registering two or more of a plurality of special effects controllers at a plurality of network addresses to create an ad-hoc special effects synchronization zone, each of the plurality of special effects controllers communicatively connected to one or more of the plurality of special effects devices to facilitate causing a special effect to occur;
receiving an indication of a special effect type and timing; and
causing a stream of data packets to be distributed wirelessly to one or more of the discovered and registered plurality of special effect controllers according to the indicated special effect type and timing, such that a special effect is caused to be performed on each of the special effects devices that is communicatively connected to a corresponding one or more of the discovered and registered plurality of special effect controllers.

19. The computer-readable memory medium of claim 18 wherein at least one of the plurality of special effect controllers is located at a first network address and wherein at least an other of the plurality of special effect controllers is located at a second network address, the first and second network addresses being at distinct locations from each other.

20. The computer-readable memory medium of claim 18 wherein the stream of data packets adhere to a DMX protocol.

21. The computer-readable memory medium of claim 18 wherein the indicated special effect type and timing is associated with a portion of an audio stream or audio data.

22. The computer-readable memory medium of claim 21 wherein the audio stream or data is delivered live.

23. The computer-readable memory medium of claim 21 wherein the audio stream or data is pre-recorded, pre-defined, or automatically computed.

24. The computer-readable memory medium of claim 21 wherein the stream of data packets caused to be distributed wirelessly to one or more of the discovered and registered plurality of special effect controllers is responsive to an analysis of the audio stream or data.

25. The computer-readable memory medium of claim 18 wherein the method further comprises: receiving an indication of a special effect type by receiving data from a sensor indicative of a condition for which the special effect type is appropriate.

26. The computer-readable memory medium of claim 25 wherein the sensor detects at least one of proximity, light wave, radio-frequency, temperature, respiration, heart rate, and/or pulse.

* * * * *